(12) United States Patent
Huch

(10) Patent No.: US 8,255,427 B2
(45) Date of Patent: Aug. 28, 2012

(54) GENERATING MODIFIED SCHEMAS

(75) Inventor: Alan T. Huch, Richardson, TX (US)

(73) Assignee: Raytheon Company, Waltham, MA (US)

( * ) Notice: Subject to any disclaimer, the term of this patent is extended or adjusted under 35 U.S.C. 154(b) by 375 days.

(21) Appl. No.: 12/542,831

(22) Filed: Aug. 18, 2009

(65) Prior Publication Data

US 2012/0197945 A1 Aug. 2, 2012

(51) Int. Cl.
*G06F 17/30* (2006.01)

(52) U.S. Cl. .......................................... 707/802

(58) Field of Classification Search .................. 707/694, 707/792, 793, 802, 806, 809; 715/200, 234, 715/243
See application file for complete search history.

(56) References Cited

U.S. PATENT DOCUMENTS

| | | | |
|---|---|---|---|
| 7,089,491 B2 * | 8/2006 | Feinberg et al. ............ | 715/234 |
| 7,143,346 B2 | 11/2006 | Dunne et al. | |
| 7,200,805 B2 | 4/2007 | Carlson et al. | |
| 7,237,190 B2 | 6/2007 | Rollins et al. | |
| 7,395,271 B2 | 7/2008 | Idicula et al. | |
| 7,487,515 B1 * | 2/2009 | Jones et al. ................... | 719/328 |
| 7,530,015 B2 | 5/2009 | Sampathkumar et al. | |
| 2002/0143818 A1 * | 10/2002 | Roberts et al. ................ | 707/513 |
| 2003/0135825 A1 | 7/2003 | Gertner et al. | |
| 2003/0208498 A1 * | 11/2003 | Feinberg et al. ............. | 707/100 |
| 2004/0006738 A1 * | 1/2004 | Szabo et al. ................... | 715/513 |
| 2007/0112851 A1 * | 5/2007 | Tomic et al. ............... | 707/104.1 |
| 2008/0072140 A1 * | 3/2008 | Vydiswaran et al. ......... | 715/243 |
| 2008/0196002 A1 * | 8/2008 | Koster .......................... | 717/106 |
| 2008/0208887 A1 * | 8/2008 | Balachandran et al. ...... | 707/102 |
| 2008/0243807 A1 * | 10/2008 | Gaucas et al. .................... | 707/5 |
| 2009/0024640 A1 * | 1/2009 | Petri ............................. | 707/100 |

OTHER PUBLICATIONS

Powerpoint presentation entitled "Overview of XML Data Flow Configuration Files & Bray: A Configuration and Validation Tool for DFCFs," 29 pages, Mar. 4, 2008.

* cited by examiner

*Primary Examiner* — Cam-Linh Nguyen
(74) *Attorney, Agent, or Firm* — Schwegman, Lundberg & Woessner, P.A.

(57) ABSTRACT

According to one embodiment, a computer-readable medium has computer-executable instructions that, when executed by a computer, are configured to receive an input schema. The input schema specifies how to represent one or more elements in a document. One or more rules are received. The input schema is analyzed for conformance to the one or more rules. If the input schema does not conform to the one or more rules, a modified schema is generated based on the input schema. The modified schema specifies how to represent the one or more elements in the documents in conformance with the one or more rules.

53 Claims, 1 Drawing Sheet

GENERATING MODIFIED SCHEMAS

GOVERNMENT FUNDING

The U.S. Government may have certain rights in this invention as provided for by the terms of U.S. Government Contract No. F19628-03-D-0015-0067 granted by the National Geospatial-Intelligence Agency.

TECHNICAL FIELD

This invention relates generally to the field of content management systems and more specifically to generating modified schemas.

BACKGROUND

Using a programming language, information may be represented in conformity with a specified schema. For example, the schema may define the structure of a document. The schema may also limit the type and form of information represented in the document.

SUMMARY OF THE DISCLOSURE

According to one embodiment, a computer-readable medium has computer-executable instructions that, when executed by a computer, are configured to receive an input schema. The input schema specifies how to represent one or more elements in a document. One or more rules are received. The input schema is analyzed for conformance to the one or more rules. If the input schema does not conform to the one or more rules, a modified schema is generated based on the input schema. The modified schema specifies how to represent the one or more elements in the documents in conformance with the one or more rules.

Certain embodiments of the invention may provide one or more technical advantages. A technical advantage of one embodiment may include the capability to generate modified schemas. Yet other technical advantages may include the capability to modify existing schemas according to inputs such as defined rules and instance documents. Yet other technical advantages may include the capability to constrain existing schemas. Yet other technical advantages may include the capability to limit the transmission between domains of information represented in a document. Yet other technical advantages may include the capability to measure validation of documents under a modified schema and accept further modifications.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Schemas may be described according to a variety of constructs. Examples include, but are not limited to, Extensible Markup Language (XML), Web Services Description Language (WSDL), and Simple Network Management Protocol (SNMP). Embodiments are not limited to any particular programming language or schema. For illustrative purposes, XML embodiments may be described below; however, embodiments are not limited to XML implementations.

Schemas may be defined in a variety of ways. For example, in some embodiments, XML schemas may be defined according to data type. For example, an XML schema may define an element's range of values, the element's representation of those values, and/or the element's characteristics or facets. These definitions may be either restrictive or non-restrictive. For example, an XML schema may define an element as a date. A restrictive definition may restrict the element to a date format representing the day, month, and year; a non-restrictive definition may characterize the element as a date but not limit the date to any particular form. In another example, the value of the date may be restricted rather than the form (e.g., all dates after Jan. 1, 2000). These examples are provided purely for illustrative purposes, and embodiments are not limited to these example schema definitions and frameworks.

In some schemas, elements may not include any restrictions or characterizations. For example, in some XML schemas, elements may be defined as "anyType," or a variant thereof. The anyType identifier may be considered as a primitive data type that does not constrain an element. For example, a schema designer might insert an anyType identifier as a placeholder in a generalized schema. In this example, the schema designer may contemplate that a programmer would replace the anyType with a more restrictive identifier. However, some schema implementations may still include anyType identifiers for a variety of reasons. For example, replacing anyType identifiers may be time-consuming, or a proper definition may not be known before implementation of the schema.

Figure 1:
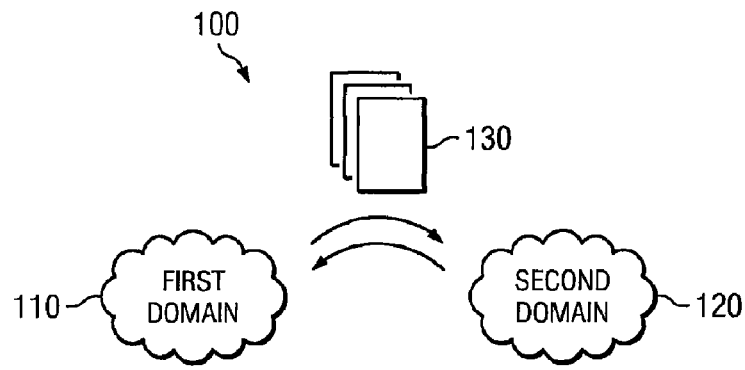
FIG. 1 shows an example cross-domain environment.

However, using a nonrestrictive identifier such as anyType may result in security problems. For example, FIG. 1 shows an example cross-domain environment 100. The environment 100 features a first domain 110 and a second domain 120. The first domain 110 and the second domain 120 may have different security levels. Examples of the first domain 110 and the second domain 120 may include internet domains or enterprise domains.

In the environment 100, documents 130 travel between the first domain 110 and the second domain 120. In this example, the documents 130 may include elements that are not constrained, and the range of values for these elements are thus unbounded. For example, an element in the document 130 may be designated as a "date" element; however, values for this element are not limited to date, but instead may include any value. Security concerns might arise, for example, if a secret password was entered into the "date" element.

Accordingly, teachings of certain embodiments recognize the ability to forbid certain characteristics of the document 130 to cross from the first domain 110 to the second domain 120. In one example, the document 130 may be secured by replacing nonrestrictive schema definitions with restrictive schema definitions. However, teachings also recognize that the ability to modify schemas are not limited to restrictive modifications for security concerns. For example, in some embodiments, modified schemas may remove restrictions on elements, rather than add them. Additionally, in some embodiments, schemas may be modified independently of security concerns, and modified schemas may not provide any additional security benefits.

Figure 2:
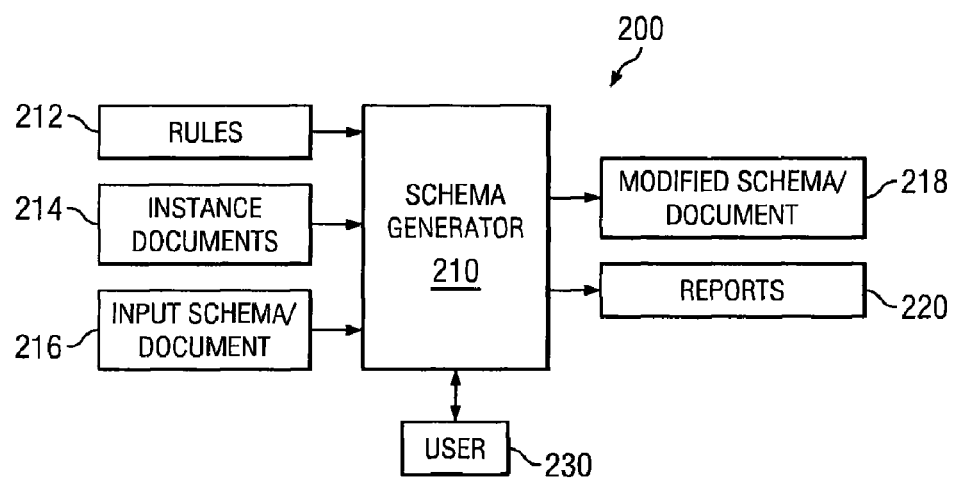
FIG. 2 shows a schema modification system according to one embodiment.

FIG. 2 shows a schema modification system 200 according to one embodiment. Schema modification system features a schema generator 210. In this example, the schema generator 210 may receive inputs such as rules 212, instance documents 214, and input schemas 216. The schema generator may generate modified schemas 218 and/or a report 220.

The input schemas and documents 216 and modified schemas and documents 218 may be described according to a variety of constructs. Examples include, but are not limited to, XML, WSDL, and SNMP. For example, the input schema or document 216 may be an XML schema. In another example, the input or document 216 may be a WSDL document that references multiple schemas, such as multiple XML schemas. Embodiments are not limited to any particular programming language or schema. For illustrative purposes, XML embodiments may be described below; however, embodiments are not limited to XML implementations.

In one example embodiment, the input schema 216 may include a nonrestrictive schema. For example, the input schema 216 may include anyType elements. In one embodiment, the schema generator 210 may use the input schema 216 as a base schema. For example, the rules 212 and the instance documents 214 may be used to modify the input schema 216 and generate the modified schema 218.

For example, the rules 212 may modify elements of the input schema 216. The rules 212 may include any suitable statements that may define the scope of a schema element. In one non-limiting example, the rules 212 may prohibit an identified string and any derived string type. In another non-limiting example, anyType identifiers may be replaced with a specific type.

In yet another non-limiting example, the rules 212 may define the characteristics of a string, such as the length, enumeration, or pattern. An example defining the string by length might include a rule 212 that limits the length of a string to 32 characters. An example defining the string by enumeration may include a rule 212 that limits an element to a specified set of values. An example defining the string by pattern may include a rule 212 that limits a U.S. phone number element to a three digit area-code number in parenthesis and a seven digit local number separated by a hyphen.

Some example embodiments of rule 212 may incorporate multiple definitions. For example, an international phone number may include an international code, an area code, and a local number. In this example, the international codes may be limited to an enumerated list of international calling codes. The length of the area code and the local number may be further defined depending on the country (e.g., the United States has a 3 digit area code and a 7 digit local number, but the United Kingdom has a four digit area code and a six digit local number). The international phone number may also be defined to follow a specific pattern, such as the U.S. telephone pattern (e.g., (555) 555-5555).

In one embodiment, the schema generator 210 may analyze the input schema 216 for conformance to the rules 212. If the input schema 216 does not conform to the rules 212, the schema generator 210 may generate a modified schema 218 that is based on the input schema 216. This modified schema 218 may represent an updated version of the input schema 216 that is in conformance with the rules 212.

In addition to the rules 212, the schema generator 210 may also receive instance documents 214. One example of an instance document 214 may include a document that conforms to a particular schema. The particular schema may or may not correspond to the input schema 216.

The instance documents 214 may be analyzed by the schema generator 210 to refine the input schemas 216. For example, the instance documents 214 may be analyzed to develop rules, such as the rules 212. In one example, the instance documents 214 may be used to develop an enumeration list for a rule. In another example, the schema generator 210 may look for patterns or build syntax off of examples from the instance documents 214. In some embodiments, the selection of instance documents 214 may be defined according to the rules 212 and/or the schema generator 210.

In WSDL implementations, the schema generator 210 may provide additional modifications to input documents 216. In one non-limiting example, the input document 216 may be an WSDL document that references multiple schemas. For example, the WSDL document may reference 75 schemas. However, a set of WSDL messages may only use 50 of those schemas. In this example, the schema generator may modify the WSDL document to only reference the 50 schemas used. In other non-limiting examples, the WSDL document may be modified if certain WSDL messages are not being used or if schemas referenced by the WSDL document need modification.

In some embodiments, the modified schema 218 will be automatically generated from the input schema 216 if the input schema 216 is not in conformance with the rules 212 and/or the instance documents 214. However, in some embodiments, the schema generator 210 may prompt a user 230 for user input. For example, in one embodiment, the user 230 may approve modifications to the input schema 216. In some embodiments, the user 230 may suggest modifications to the input schema 216 to bring the input schema 216 in conformance with the rules 212 and/or the instance documents 214. In some embodiments, the user 230 may further refine the modifications, such as scenarios where the schema generator 210 recognizes a pattern but does not recognize that the pattern is a phone number. In some embodiments, the user 230 may reject proposed modifications to the input schema 216. In some embodiments, the decision whether to implement automatic modification or to prompt for user input may be defined by the rules 212 and/or settings within the schema generator 210.

In some embodiments, the schema generator 210 may create reports 220. One non-limiting example of the reports 220 may include a report identifying input schemas or documents 216 that do not conform to the rules 212. Another non-limiting example of the reports 220 may include statistics regarding non-conforming elements and figures indicating an overall risk factor. This overall risk factor may express the risk of non-conforming information being incorporated into a document and passing to a different domain. Yet another non-limiting example of the reports 220 may include reports regarding the instance documents 214, such as statistics regarding the percentage of instance documents 214 that conform to a particular pattern.

In yet another embodiment, the reports 220 may help evaluate the utility of the rules 212. For example, the reports 220 may reveal that some rules are more valuable than others or that some rules should be prioritized over others. In addition, the reports 220 may identify rules 212 that are over-restrictive.

Yet another non-limiting example may include reports regarding documents that failed to properly validate under the modified schema 218. In some embodiments, the documents that failed to validate under the modified schema 218 may be analyzed using any suitable mechanism. In some embodiments, the failed documents may be treated as instance documents 214. In some embodiments, the schema generator 210 may further modify the modified schema 218 based on the documents that failed to properly validate. In these embodiments, further modifications to the modified schema 218 may be made automatically or by a user.

In some embodiments, the schema generator 210 may not inspect or validate documents against the input schema 216 or the modified schema 218. For example, in some embodiments, inspection or validation may be outsourced to a second module. In some embodiments, the schema generator 210 may provide code used by the second module to inspect and/or validate any element of a document that is too difficult to modify within the input schemas 216. In some embodiments, this second module may also monitor the flow of documents between the first and second domains 110 and 120 of FIG. 1, although embodiments of the schema generator 210 may monitor document flow as well.

Figure 3:
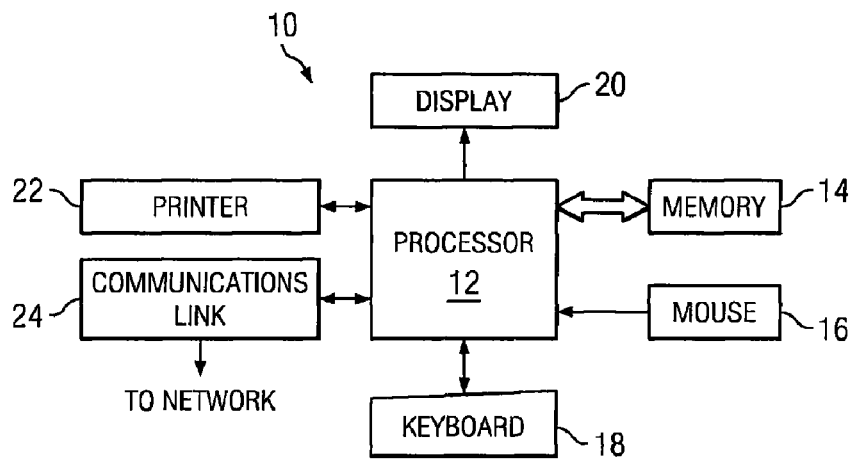
FIG. 3 presents an embodiment of a general purpose computer operable to perform one or more operations of various embodiments of the invention.

FIG. 3 presents an embodiment of a general purpose computer 10 operable to perform one or more operations of various embodiments of the invention. The general purpose computer 10 may generally be adapted to execute any of the well-known OS2, UNIX, Mac-OS, Linux, and Windows Operating Systems or other operating systems. The general purpose computer 10 in this embodiment comprises a processor 12, a memory 14, a mouse 16, a keyboard 18, and input/output devices such as a display 20, a printer 22, and a communications link 24. In other embodiments, the general purpose computer 10 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 12, may manage the operation of the general purpose computer 10. Examples of the processor 12 include one or more microprocessors, one or more applications, and/or other logic. Certain logic may include a computer program, software, computer executable instructions, and/or instructions capable being executed by the general purpose computer 10. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 14. The memory 14 may comprise one or more tangible, computer-readable, and/or computer-executable storage medium. Examples of the memory 14 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communications link 24 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. For example, multiple general purpose computers 10 or other computers may be networked through the Internet and/or in a client server network. Embodiments of the invention may also be used with a combination of separate computer networks each linked together by a private or a public network.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order and in any suitable combination. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A computer-readable medium having computer-executable instructions, when executed by a computer configured to:
   receive an input schema, the input schema specifying how to represent one or more elements in a document;
   receive one or more instance documents;
   generate one or more rules from the one or more instance documents;
   analyze the input schema for conformance to the one or more rules; and
   if the input schema does not conform to the one or more rules, generate a modified schema based on the input schema, the modified schema specifying how to represent the one or more elements in the document in conformance with the one or more rules.

2. The computer-readable medium of claim 1, the one or more rules constraining how the one or more elements are represented in the document.

3. The computer-readable medium of claim 1, the one or more rules specifying how to represent the one or more elements according to a specified type.

4. The computer-readable medium of claim 3, the specified type limited by restrictions available in the language of the input schema or the modified schema.

5. The computer-readable medium of claim 2, wherein the one or more rules comprise limiting a string by a facet selected from the group consisting of: length, enumeration, pattern.

6. The computer-readable medium of claim 1, the instructions when executed further configured to generate the one or more rules from the one or more instance documents by generating a syntax from one or more element instances provided by the one or more instance documents.

7. The computer-readable medium of claim 1, the one or more rules limiting elements to element instances provided by the one or more instance documents.

8. The computer-readable medium of claim 1, the instructions when executed further configured to generate the one or more rules from the one or more instance documents by:
  identifying a pattern from one or more element instances provided by the one or more instance documents, and
  generating a rule that limits elements to the pattern.

9. The computer-readable medium of claim 1, the instructions when executed further configured to generate the one or more rules from the one or more instance documents by identifying a type from one or more element instances provided by the one or more instance documents.

10. The computer-readable medium of claim 1, wherein the input schema or the modified schema is an Extensible Markup Language (XML) schema.

11. The computer-readable medium of claim 1, wherein the input schema or the modified schema is an XML schema, and wherein the one or more instance documents are XML instance documents.

12. The computer-readable medium of claim 1, wherein the input schema or the modified schema is a WSDL document.

13. The computer-readable medium of claim 12, wherein the input schema is a Web Services Description Language (WSDL) schema referencing a plurality of schemas, the one or more rules modifying the number of plurality of schemas referenced by the WSDL document.

14. The computer-readable medium of claim 1, wherein the input schema is a WSDL document, the WSDL document referencing a plurality of schemas, the instructions when executed further operable to generate the one or more rules from the one or more instance documents by eliminating schemas from the plurality of schemas that are not referenced by the instance documents.

15. The computer-readable medium of claim 1, wherein the modified schema is a Simple Network Management Protocol (SNMP) Management Information Base (MIB) schema.

16. The computer-readable medium of claim 1, the instructions when executed are further operable to validate a document against the modified schema.

17. The computer-readable medium of claim 16, wherein the document is being transmitted from a first domain to a second domain, the instructions when executed further operable to halt the transmission of the document from the first domain to the second domain if the document is not properly validated against the modified schema.

18. The computer-readable medium of claim 16, the instructions when executed are further operable to generate a report if the document is not properly validated against the modified schema.

19. The computer-readable medium of claim 18, the instructions when executed are further operable to:
  compile a plurality of reports, the plurality of reports corresponding to a plurality of documents that failed to properly validate; and
  further modify the modified schema based on the plurality of reports.

20. The computer-readable medium of claim 16, the instructions when executed are further operable to further modify the modified schema if the document failed to properly validate.

21. The computer-readable medium of claim 1, the instructions when executed are further operable to generate a modified schema based on the input schema by accepting user instructions from a user.

22. The computer-readable medium of claim 21, the user instructions approving, rejecting, or suggesting, changes to the modified schema.

23. A computer-readable medium having computer-executable instructions, when executed by a computer configured to:
  receive an input schema, the input schema specifying how to represent one or more elements in one or more documents;
  receive one or more rules;
  analyze the input schema for conformance to the one or more rules;
  if the input schema does not conform to the one or more rules, generate a modified schema based on the input schema, the modified schema specifying how to represent the one or more elements in the one or more documents in conformance with the one or more rules;
  validate a document against the modified schema; and
  generate a report if the document is not properly validated against the modified schema.

24. The computer-readable medium of claim 23, wherein the document is being transmitted from a first domain to a second domain, the instructions when executed further operable to halt the transmission of the document from the first domain to the second domain if the document is not properly validated against the modified schema.

25. The computer-readable medium of claim 23, the instructions when executed are further operable to:
  compile a plurality of reports, the plurality of reports corresponding to a plurality of documents that failed to properly validate; and
  further modify the modified schema based on the plurality of reports.

26. The computer-readable medium of claim 23, the instructions when executed are further operable to further modify the modified schema if the document failed to properly validate.

27. A method for generating a modified schema, comprising:
  using a computer system, receiving an input schema, the input schema specifying how to represent one or more elements in a document;
  using a computer system, receiving one or more instance documents; and
  using a computer system, generating one or more rules from the one or more instance documents;
  using a computer system, analyzing the input schema for conformance to the one or more rules; and
  using a computer system, if the input schema does not conform to the one or more rules, generating a modified schema based on the input schema, the modified schema specifying how to represent the one or more elements in the document in conformance with the one or more rules.

28. The method of claim 27, the one or more rules constraining how the one or more elements are represented in the document.

29. The method of claim 27, the one or more rules specifying how to represent the one or more elements according to a specified type.

30. The method of claim 29, the specified type limited by restrictions available in the language of the input schema or the modified schema.

31. The method of claim 28, wherein the one or more rules comprise limiting a string by a facet selected from the group consisting of: length, enumeration, pattern.

32. The method of claim 27, further comprising generating a syntax from one or more element instances provided by the one or more instance documents.

33. The method of claim 27, the one or more rules limiting elements to element instances provided by the one or more instance documents.

34. The method of claim 27, further comprising:
identifying a pattern from one or more element instances provided by the one or more instance documents, and
generating a rule that limits elements to the pattern.

35. The method of claim 27, further comprising identifying a type from one or more element instances provided by the one or more instance documents.

36. The method of claim 27, wherein the input schema or the modified schema is an Extensible Markup Language (XML) schema.

37. The method of claim 27, wherein the input schema or the modified schema is an XML schema, and wherein the one or more instance documents are XML instance documents.

38. The method of claim 27, wherein the input schema or the modified schema is a WSDL document.

39. The method of claim 38, wherein the input schema is a Web Services Description Language (WSDL) schema referencing a plurality of schemas, the one or more rules modifying the number of plurality of schemas referenced by the WSDL document.

40. The method of claim 39, wherein the input schema is a WSDL document, the WSDL document referencing a plurality of schemas, the method further comprising generating the one or more rules from the one or more instance documents by eliminating schemas from the plurality of schemas that are not referenced by the instance documents.

41. The method of claim 27, wherein the modified schema is a Simple Network Management Protocol (SNMP) Management Information Base (MIB) schema.

42. The method of claim 27, further comprising validating a document against the modified schema.

43. The method of claim 42, wherein the document is being transmitted from a first domain to a second domain, the method further comprising halting the transmission of the document from the first domain to the second domain if the document is not properly validated against the modified schema.

44. The method of claim 42, further comprising generating a report if the document is not properly validated against the modified schema.

45. The method of claim 44, further comprising:
compiling a plurality of reports, the plurality of reports corresponding to a plurality of documents that failed to properly validate; and
further modifying the modified schema based on the plurality of reports.

46. The method of claim 42, further comprising further modifying the modified schema if the document failed to properly validate.

47. The method of claim 27, further comprising generating a modified schema based on the input schema by accepting user instructions from a user.

48. A method for generating a modified schema, comprising:
using a computer system, receiving an input schema, the input schema specifying how to represent one or more elements in one or more documents;
using a computer system, receiving one or more rules;
using a computer system, analyzing the input schema for conformance to the one or more rules;
using a computer system, if the input schema does not conform to the one or more rules, generating a modified schema based on the input schema, the modified schema specifying how to represent the one or more elements in the one or more documents in conformance with the one or more rules;
using a computer system, validating a document against the modified schema; and
using a computer system, generating a report if the document is not properly validated against the modified schema.

49. The method of claim 48, wherein the document is being transmitted from a first domain to a second domain, the method further comprising halting the transmission of the document from the first domain to the second domain if the document is not properly validated against the modified schema.

50. The method of claim 48, further comprising:
compiling a plurality of reports, the plurality of reports corresponding to a plurality of documents that failed to properly validate; and
further modifying the modified schema based on the plurality of reports.

51. The method of claim 49, further comprising further modifying the modified schema if the document failed to properly validate.

52. The method of claim 1, wherein generating one or more rules from the one or more instance documents comprises inferring rules from the one or more instance documents.

53. The method of claim 1, further comprising receiving one or more second rules, and the modified schema specifying how to represent the one or more elements in the document in conformance with the one or more rules and second rules.

* * * * *